UNITED STATES PATENT OFFICE.

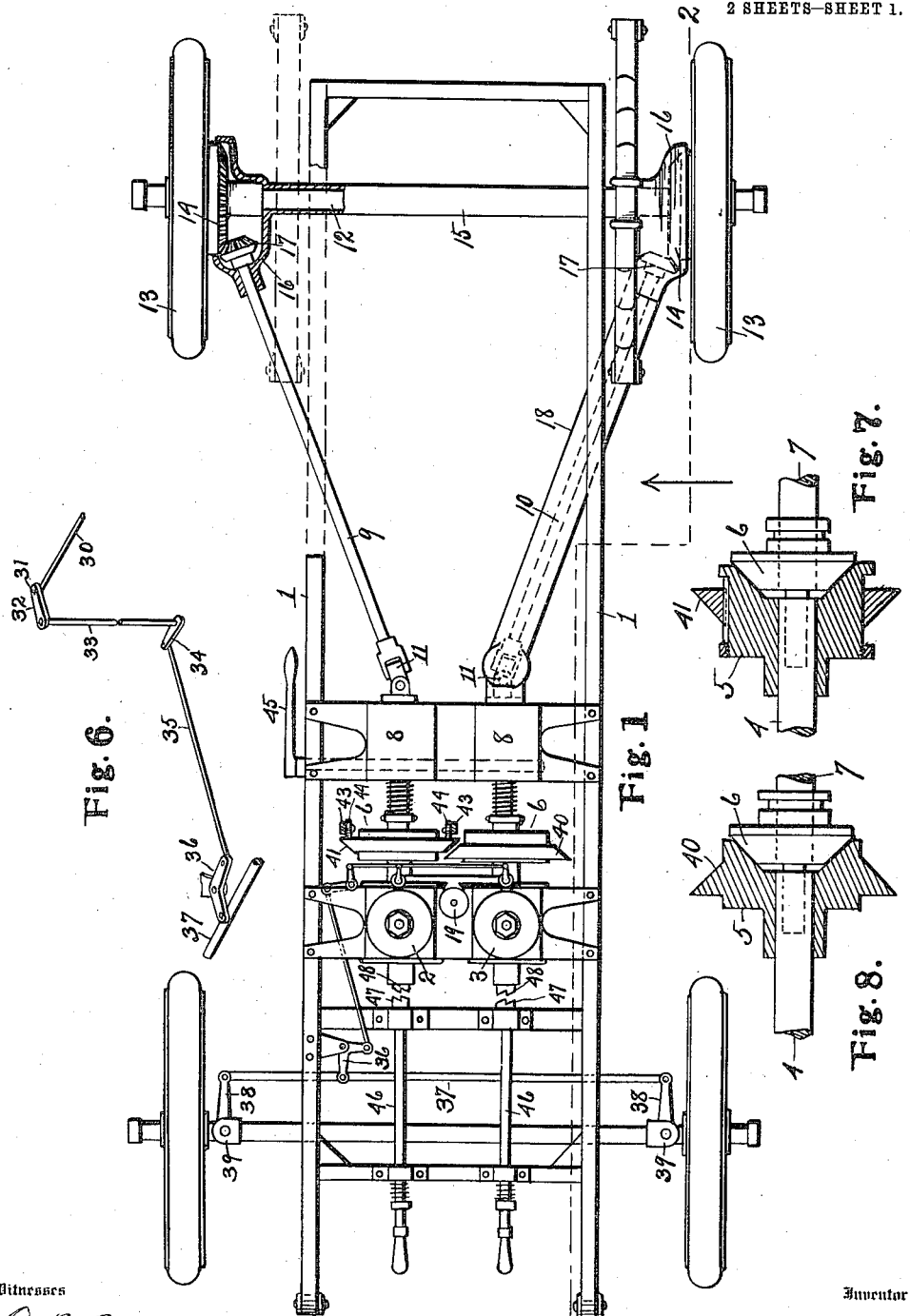

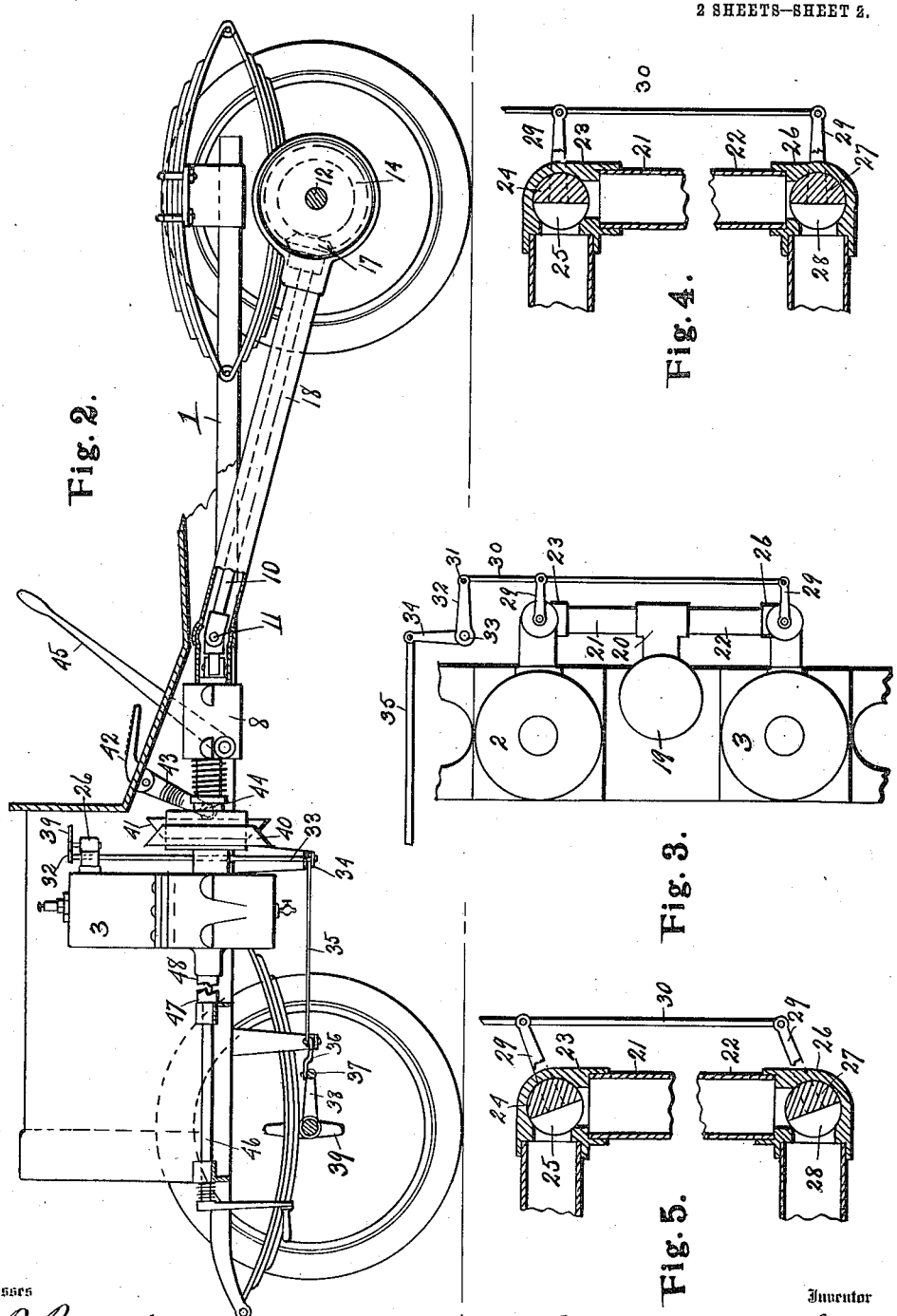

KARL A. KENDRICK, OF DETROIT, MICHIGAN, ASSIGNOR OF ONE-HALF TO HARRISON GEER, OF DETROIT, MICHIGAN.

DRIVING MECHANISM FOR MOTOR-VEHICLES.

972,455.

Specification of Letters Patent.

Patented Oct. 11, 1910.

Application filed August 18, 1909. Serial No. 513,378.

*To all whom it may concern:*

Be it known that I, KARL A. KENDRICK, a citizen of the United States, residing at Detroit, in the county of Wayne, State of Michigan, have invented certain new and useful Improvements in Driving Mechanism for Motor-Vehicles; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to driving mechanisms for motor vehicles, and consists in the construction and arrangement of parts hereinafter more fully set forth and pointed out particularly in the claims.

The objects of the invention are to provide, first, for driving independently each of the rear wheels of a motor vehicle, thereby obviating the use of differential gearing.

A further object is to provide for so connecting the two motors as to apply their combined power to either one of the rear wheels.

A further object is to provide for automatically controlling the flow of the explosive mixture to said motors so that when making a turn, the motor driving the outside wheel shall receive a greater volume of the explosive mixture and the motor driving the inside wheel a lesser volume of said mixture than under ordinary conditions.

A further object is to provide for driving one motor from the other so as to make necessary the cranking of but one of the motors when starting the vehicle.

The above objects are attained by the mechanism illustrated in the accompanying drawings, in which:—

Figure 1 is a plan view, partly in section, of the frame and driving mechanism of a motor vehicle involving my invention. Fig. 2 is a sectional view as on line 2—2 of Fig. 1. Fig. 3 is an enlarged top plan of the motors, showing a carbureter connected thereto and the actuating rod connected with the controlling valves in the intake pipes of said motors leading from the carbureter. Fig. 4 is a fragmentary view in horizontal section through said intake pipes, showing said valves in their normal position. Fig. 5 is a similar view showing the position of said valves when the car or vehicle is turning to the left. Fig. 6 is a fragmentary view in perspective, showing the connection between the rod which joins the arms of the steering knuckles and the rod connecting the arms of said mixture-controlling valves. Fig. 7 is an enlarged sectional view through the main driving clutch of one of the motors. Fig. 8 is a similar view through the main driving clutch of the other of said motors.

Referring to the characters of reference, 1 designates the frame of the running gear which is connected in the usual manner with the axles of the vehicle and upon which are suitably supported the motors 2 and 3, said motors as herein illustrated, being of the gasolene engine type, but other types of motors may be employed, if desired. Each of the motor shafts 4 is provided thereon with a fixed female clutch member 5 adapted to receive a slidably mounted male clutch member 6 on the transmission shaft 7, as clearly shown in Fig. 7. Each of the transmission shafts 7 is suitably journaled in a case 8 in which is housed a suitable transmission gearing. Leading from the cases of the transmission gearing are the driven shafts 9 and 10 respectively, each of which is provided with a common form of universal slide coupling 11. Upon the ends of the rear axle 12 are loosely mounted to rotate the rear wheels 13, each of which is provided on the inner end of its hub with a beveled gear 14. A casing 15 embraces the rear axle and is provided at its ends with housings 16. Said housings inclose the gear wheels 14 and form bearings for the rear ends of the shafts 9 and 10 which are journaled therein and each of which carries a beveled pinion 17, said pinions meshing with the gears 14 on the hubs of the rear wheels. Each of the driving shafts is embraced by a tubular jointed casing 18 through which it passes, said cases being connected at their rear ends respectively with the housings of the rear axle casing, and at their forward ends with the casings of the transmission gearing. By this arrangement it will be understood that each of the rear wheels may be independently driven in the same direction from one of the motors through a separate transmission gearing and by means of a separately driven shaft. The advantage of this arrangement resides in the fact that by employing two motors to drive the rear wheels independently, the use of the differential gearing commonly employed, is obviated, and when making a turn, the motor driving the outer wheel may be accelerated and the motor driving the inner wheel slackened to regulate the speed of said motors in accordance with the difference in the travel of said wheels when turning, obviating the slippage which usually occurs when making an abrupt turn.

In order that the speed of the two motors may be automatically regulated accordingly as the car is turning to the right or left, provision is made for controlling the quantity of the explosive mixture which passes from the carbureter to the motors. The manner of regulating the quantity of the explosive mixture which passes to the motors when the car is turning, is illustrated in Figs. 3 to 5 inclusive, wherein 19 designates a carbureter of any suitable type which is connected by a T-coupling 20 with the intake pipes 21 and 22 leading to the cylinders 2 and 3 respectively. In the elbow 23 of the pipe 21 is located a cut-off valve 24 of the plug cock type having a way 25 through one side thereof to afford a passage for the explosive mixture to the cylinder 2. In the elbow 26 of the pipe 22 is a similar valve 27 having a way 28 through one side thereof for the passage of the explosive mixture to the cylinder 3. These valves are rotatable in embracing seats in said elbows having ports which normally register with the ways in said valves to effect a continuity of the passage for the explosive mixture through said valves to said cylinders. When the valves are in their normal position, as shown in Fig. 4, the area of the passage therethrough is the same in respect to both valves and affords a sufficient opening in respect to each valve to allow of the passage of a normal charge of the explosive mixture. When the car is turning, however, it is desirable to accelerate the speed of the motor driving the outer wheel and retard the speed of the motor driving the inner wheel; therefore, provision is made for opening one of the valves still wider and for closing the opening through the other valve in a comparative degree, as illustrated in Fig. 5, wherein is shown the position of the valves when the car is turning to the left, the valve 24 through which the explosive mixture is supplied to the cylinder 2 driving the outer wheel being open to a greater extent than that shown in Fig. 4, and the valve 27 which supplies the explosive mixture to the cylinder driving the inner wheel being correspondingly closed. By this arrangement the speed of the motor driving the outer wheel is increased in making a turn and the speed of the motor driving the inner wheel is decreased, thereby varying the speed of the motors in accordance with the distance which the driven wheels are obliged to travel in describing the circle which the car makes in turning, compensating for the difference in distance which the traction wheels travel during the turning movement of the vehicle and obviating any wear or slippage between the tread of the wheels and the track.

To provide for automatically moving the valves 24 and 27 for the purpose of accomplishing the result just described, said valves are each provided with an arm 29 and said arms are pivotally connected to an actuating rod 30. One end of the rod 30 is pivoted at 31 to a crank arm 32 fixed to the upper end of a vertical shaft 33. On the lower end of the shaft 33 is a second crank arm 34, the free end of which is pivoted to a horizontal rod 35 whose opposite end is pivoted to one arm of a bell-crank lever 36. Said bell-crank lever is suitably fulcrumed on the frame and the other arm thereof is pivoted to the connecting rod 37 which pivotally couples the arms 38 of the steering knuckles 39. As the connecting rod 37 is shifted longitudinally by the steering mechanism, not shown, to turn the steering wheels, the bell-crank lever 36 will be actuated to operate the rod 30 through the connecting mechanism to turn the valves 24 and 27 and increase the supply of the explosive mixture to one of the motors and decrease said supply to the other motor according to the direction in which the car may be turned, the arrangement being such that when the car shall again be returned to a straight course, the valves will be so positioned as to allow an equal supply of the explosive mixture to pass to each motor, as shown in Fig. 4.

In order to provide for coupling the two motors or engines to cause them to turn in unison, there is mounted upon the rim of one of the clutch members 5, a fixed friction ring 40 having a beveled face. Upon the other clutch member 5 there is mounted a similar ring 41 which is slidable upon said clutch member and rotatable therewith having a beveled face which coincides with the bevel of the ring 40. These friction rings are so positioned upon their respective clutch members that by a movement of the slidable ring 41, the beveled faces of said rings may be brought into frictional contact, thereby coupling the engines or motors together and causing them to turn in unison. This arrangement is of advantage where one traction wheel is off of the road or in a soft spot while the other remains upon the hard roadway, as the power of both motors or engines, when said engines are coupled together, may then be applied to the wheel having firm traction. The slidable friction ring 41 is moved into engagement with the ring 40 by means of a pedal 42 having a bifurcated arm 43 carrying antifriction rollers 44 which engage the opposite faces of the ring 41 on each side of the center. By an application of pressure to the pedal, the friction rings may be held in engagement to drive the motors in unison. Upon removing the pressure from said pedal, said rings will separate so as to enable the motors or engines to be driven independently.

A lever 45 is employed for actuating the transmission mechanism in the cases 8, the construction of said mechanism and the manner of connecting said lever thereto not being shown, as such arrangements are common and form no part of this invention.

Each engine or motor is provided with a crank shaft 46 carrying a clutch member 47 adapted to engage a corresponding member 48 on the engine or motor shaft for the purpose of cranking said engines in the operation of starting. It will not be necessary, however, to crank both engines for the reason that after one engine has been started, the other may be started therefrom by an engagement of the friction rings 40 and 41.

Having thus fully set forth my invention, what I claim as new and desire to secure by Letters Patent, is:—

1. Driving mechanism for motor vehicles, comprising a frame, traction wheels, two independent motors, driven shafts connecting the motors independently to the traction wheels, means for disconnecting said motors from said driven shafts, and means for connecting the motors directly together to cause them to turn in unison.

2. Driving mechanism for motor vehicles, comprising a frame, traction wheels, two independent motors, each motor connected directly to one of said wheels, means for disconnecting said connecting means, and means for connecting said motors to cause them to combine their power.

3. Driving mechanism for motor vehicles, comprising a frame, a transverse shaft, a traction wheel loosely mounted on each end of said shaft, two motors, two shafts extending from said motors to said traction wheels for driving said wheels independently, means for disconnecting the driven shafts from said motors, and means for connecting the motors to combine the power thereof on either of the driven shafts.

4. Driving mechanism for motor vehicles, comprising a frame, traction wheels, two independent explosive motors, driven shafts connecting the motors independently to the traction wheels, means for disconnecting said motors from said driven shafts, means for cranking each of the motors separately, and means for connecting the motors directly together to turn one from the other.

In testimony whereof, I sign this specification in the presence of two witnesses.

KARL A. KENDRICK.

Witnesses:
O. B. BAENZIGER,
I. G. HOWLETT.